United States Patent [19]
Duffy et al.

[11] Patent Number: 5,620,741
[45] Date of Patent: Apr. 15, 1997

[54] RESIN COATED FASTENER AND APPARATUS AND METHOD FOR MANUFACTURE OF SAME

[75] Inventors: Richard J. Duffy, Shelby Township; Eugene D. Sessa, Mt. Clemens, both of Mich.

[73] Assignee: Nylok Fastener Corporation, MaComb, Mich.

[21] Appl. No.: 591,714

[22] Filed: Jan. 25, 1996

Related U.S. Application Data

[62] Division of Ser. No. 188,065, Jan. 26, 1994, Pat. No. 5,511,510.

[51] Int. Cl.$^6$ .............................. B05D 7/22; F16B 37/12
[52] U.S. Cl. .......................... 427/181; 427/195; 411/178; 411/302
[58] Field of Search ..................................... 411/178, 258, 411/302; 427/181, 195; 118/308, 315, 316, 427, 183

[56] References Cited

U.S. PATENT DOCUMENTS

| | | | |
|---|---|---|---|
| 3,731,724 | 5/1973 | Dorflinger | 411/302 |
| 4,054,688 | 10/1977 | Duffy et al. | 427/195 |
| 4,100,882 | 7/1978 | Duffy et al. | 118/308 X |
| 4,815,414 | 3/1989 | Duffy et al. | 118/308 |
| 4,842,890 | 6/1989 | Sessa et al. | 411/302 X |
| 4,888,214 | 12/1989 | Duffy et al. | 411/302 X |
| 4,986,210 | 1/1991 | Hollstein et al. | 118/308 X |

*Primary Examiner*—Neill R. Wilson
*Attorney, Agent, or Firm*—Niro, Scavone, Haller & Niro

[57] ABSTRACT

An apparatus and method for applying a resin coating to a plurality of discrete portions of a fastener, such as both internal and external threads. A conveyor supports a fastener. The fastener is first transported past a heater and then past a first powdered resin spray assembly. Powdered resin, supplied to the first spray assembly by a resin reservoir, is used to generate a first air-borne powdered resin stream which coats one set of threads with resin when the fastener traverses the resin stream. The conveyor also transports a second resin spray assembly through the first air-borne powdered resin stream. The second spray assembly uses a resin receiver to aspirate the air-borne resin. The resin is then used to generate a second powdered resin stream which coats the other set of fastener threads.

10 Claims, 3 Drawing Sheets

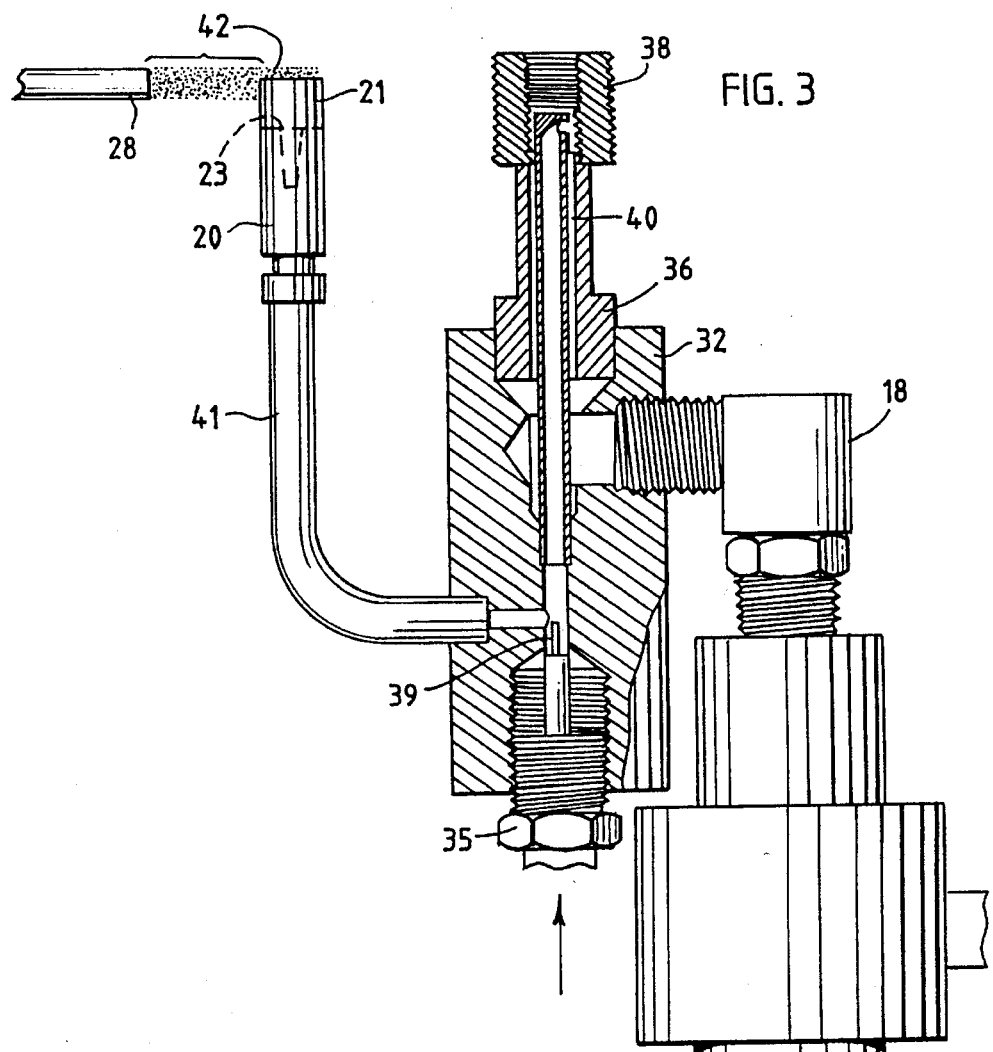
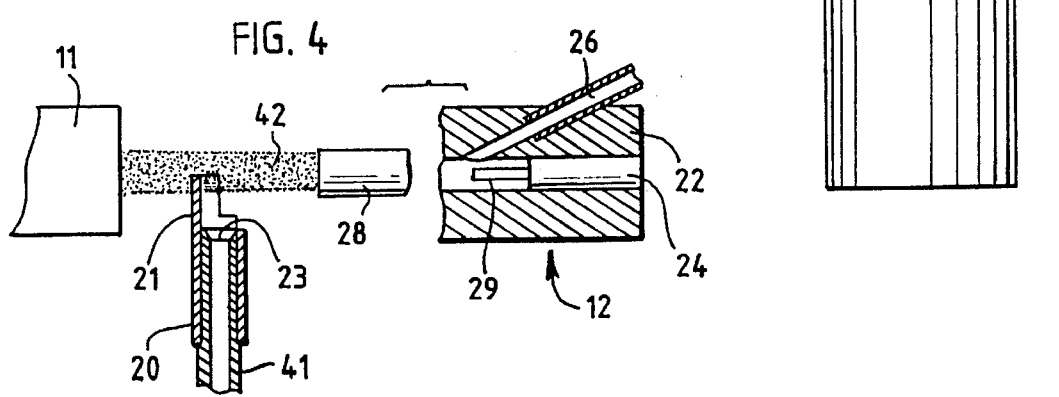

RESIN COATED FASTENER AND APPARATUS AND METHOD FOR MANUFACTURE OF SAME

This is a divisional of application Ser. No. 08/188065 filed on Jan. 26, 1994, now U.S. Pat. No. 5,511,510.

BACKGROUND OF THE INVENTION

This invention relates to an apparatus and method for applying a resin coating or patch to threaded fasteners. More particularly, the invention relates to an apparatus and method for applying a resin coating or patch to different portions of the fastener, such as its external and internal threads. The invention also relates to a self-locking fastener having both external and internal threads with a resin coating thereon.

This invention is particularly suited for applying a resin coating or patch to threaded inserts, which are fasteners that have both external and internal threads. Threaded inserts are typically installed into a receiving member where its external threads engage the receiving member. A separate externally threaded fastener may be then, in turn, installed and engaged with the threaded fastener's internal threads.

As with other fasteners, certain applications require that the threaded insert be self-locking, and some applications require the self-locking feature on both the external and internal threads of the insert. This has been previously achieved by a technique in which a vertical or horizontal bore is first made in the threaded insert to receive a pellet or strip of resilient plastic. While this technique is effective, it unduly increases the threaded insert's cost due to the additional machining step required.

Various methods and apparatus are also disclosed in the prior art for economically applying resin locking patches or coatings to either the external or internal threads of fasteners. For example, U.S. Pat. Nos. 3,579,684 and 3,858,262 are directed to techniques in which a fastener is heated and heat fusible powdered resin is then sprayed on the external or internal threads. The resin then adheres to the heated threads forming a coating or patch. These methods, however, do not address the application of a patch or coating to both the external and internal threads of a fastener.

It would, therefore, be advantageous to provide an apparatus and method which applies a resin coating or patch to different portions of a threaded fastener, such as both the external and internal threads of a fastener. It would also be advantageous to provide an apparatus which reduces the manufacturing costs of producing a threaded insert which has a reusable self-locking resin coating or patch on both its external and internal threads. Moreover, it would be advantageous to provide a self-locking fastener having both external and internal threads with an applied locking patch of resilient resin material.

SUMMARY OF THE INVENTION

The present invention is directed to an apparatus and method that applies a resin coating to different discrete portions of a threaded fastener, such as both the external and internal threads of the fastener. The present invention includes a conveyor adapted to support the fasteners and to move the fasteners along a path adjacent to a heater and then past a first powdered resin spray assembly. A resin reservoir supplies resin to the first powdered resin spray assembly which, in turn, generates a first air-borne powdered resin stream that impinges, adheres to and coats a portion of one set of threads. The conveyor also carries one or more second powdered resin spray assemblies that move with the fasteners for generating a second powdered resin stream for similarly coating a portion of the other set of threads. The second powdered resin spray assembly includes a resin receiver positioned so as to pass through the first air-borne powdered resin stream. Upon entry into the resin stream, the resin receiver aspirates the air-borne powdered resin which is then discharged as the second powdered resin stream.

Preferably, the first air-borne powdered resin stream is generated through the use of a pressurized air supply which directs a high velocity stream of air past a conduit connected to the resin reservoir. The pressurized air stream creates a vacuum that draws the resin out of the reservoir and into the air stream where it is discharged through a first nozzle. It is also desirable to use the same technique to create the second powdered resin stream. A second pressurized air supply directs a high velocity air flow past a resin transfer conduit connected to the receiver. The ensuing vacuum aspirates resin into the resin receiver from the first air-borne powdered resin stream. The captured resin is, in turn, entrained into the air stream and is discharged through a second nozzle.

The present invention is also directed to a prevailing torque, self-locking fastener comprising a fastener body having an internal cylindrical surface and external cylindrical surface; a first set of threads disposed on the internal cylindrical surface; a second set of threads disposed on the external cylindrical surface; a first patch of resilient thermoplastic resin material adheringly applied to the first set of internal threads by spraying a stream of powdered resin onto the first set of threads that have been preheated to a temperature above the point of said resin; and a second patch of resilient thermoplastic resin material adheringly applied to the second set of external threads in the same manner.

DESCRIPTION OF THE DRAWINGS

The novel features which are characteristic of the present invention are set forth in the appended claims. The invention itself, however, together with further objects and attendant advantages thereof, will be best understood by reference to the following detailed description taken in connection with the accompanying drawings in which:

FIG. 3 is a side view of the resin receiver within the first air-borne powdered resin stream as well as a partial cross-sectional view of other components of the second powdered resin spray assembly;

FIG. 4 is an enlarged partial cross-sectional view of the resin receiver passing through the first air-borne powdered resin stream generated by the first powdered resin spray assembly;

DETAILED DESCRIPTION OF THE PREFERRED EMBODIMENT

The apparatus of the present invention may be employed with a wide variety of internally and externally threaded fasteners. In each case, a reusable coating or patch of resilient resin material is adheringly applied to both the internal and external threads in a single time-saving and cost effective process.

Figures 1, 2:
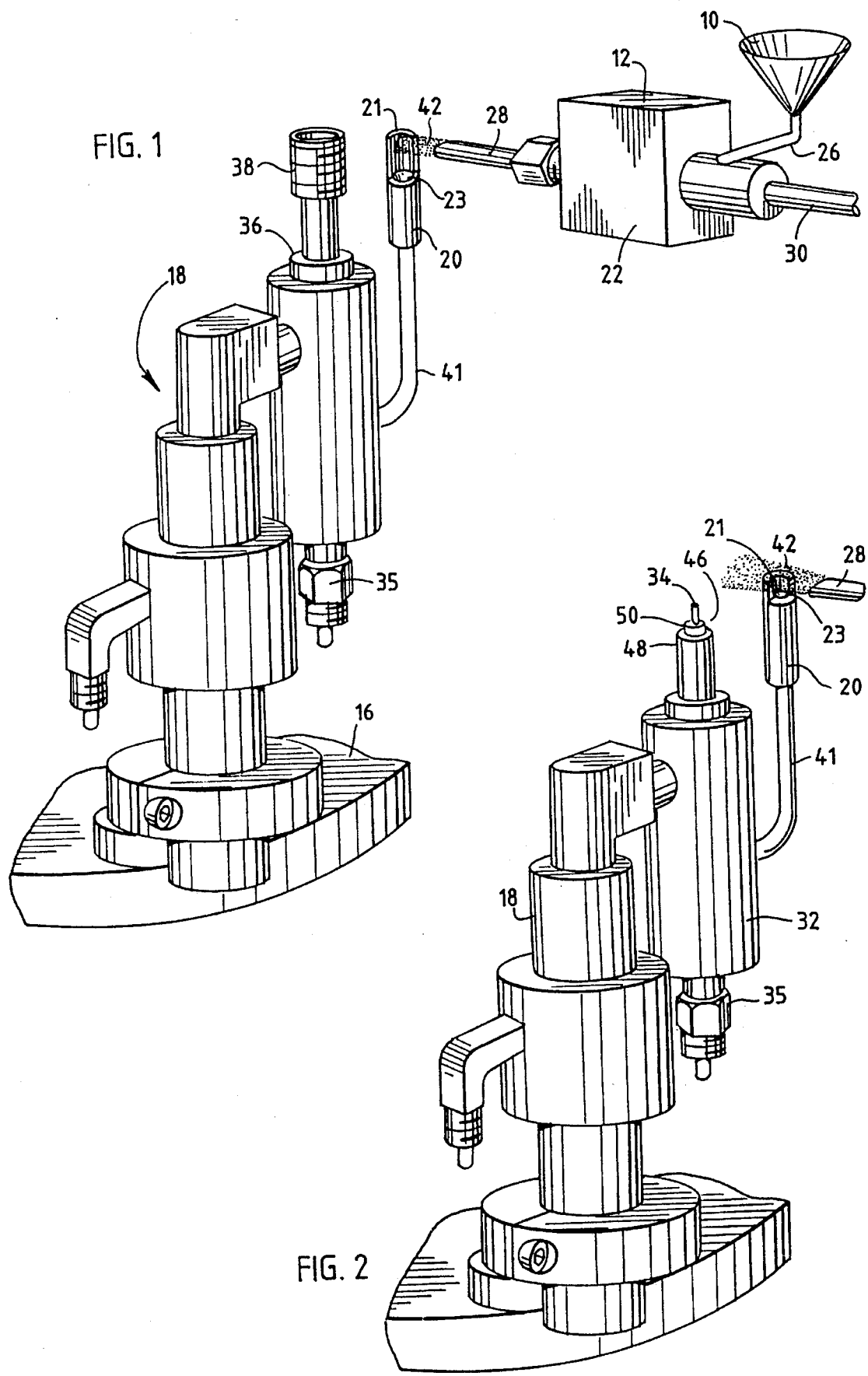
FIG. 1 is a perspective view of one embodiment of the apparatus of the present invention.
FIG. 2 is a perspective view of the first and second powdered resin spray assemblies with the fastener removed from its support and showing how the resin receiver traverses the first air-borne powdered resin stream to create a second powdered resin stream.
Figure 5:
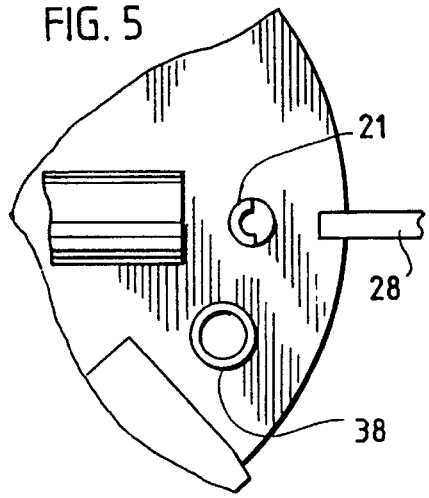
FIG. 5 is a plan view showing the relative position of certain components of one preferred embodiment when the receiver is aligned with the first resin spray assembly as illustrated in FIG. 1.
Figure 6:
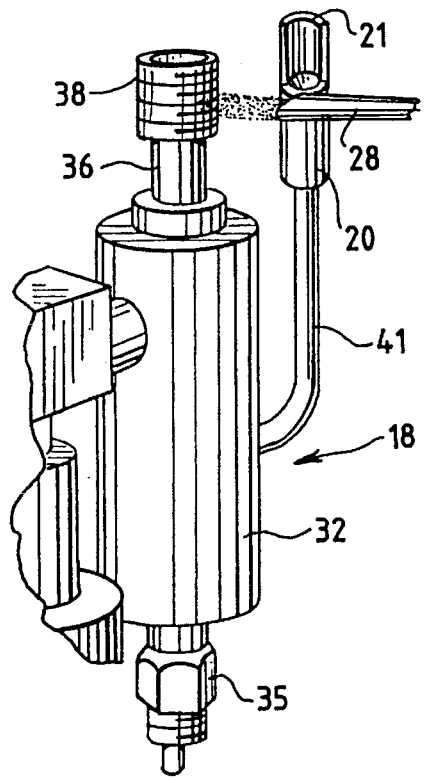
FIG. 6 is a perspective view illustrating the position of certain components when the threaded fastener's external threads are aligned with the first resin spray assembly.
Figure 7:
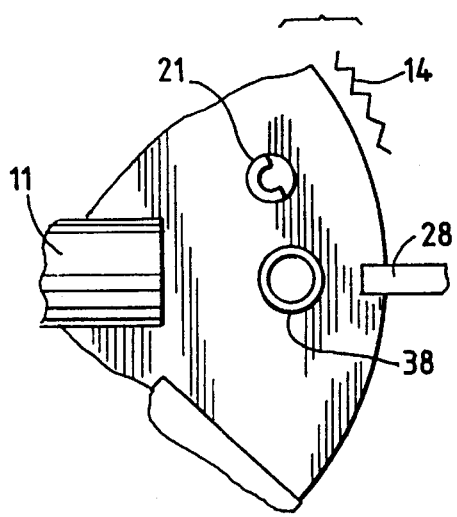
FIG. 7 is a plan view similar to FIG. 5 showing the relative position of certain components when the fastener is aligned with the first resin spray assembly as illustrated in FIG. 6.

In accordance with the preferred embodiment as shown in FIG. 1, the patch application apparatus includes powdered resin reservoir 10, first powdered resin spray assembly 12, heater 14 (FIG. 7), conveyor 16, second powdered spray assembly 18 and resin receiver 20.

First powdered resin spray assembly 12 includes mounting block 22 which contains air supply conduit 24 and reservoir conduit 26. Attached to air supply conduit 24 is first nozzle 28 and first pressurized air supply 30, which directs air through conduit 24, jet 29 and first nozzle 28. One end of reservoir conduit 26 is in communication with air supply conduit 24 and the other end is in communication with resin reservoir 10.

Second spray assembly 18 includes spray tube block 32 and second nozzle 34. Coaxially disposed over second nozzle 34 is fastener support 36. Fastener support 36 is adapted to support and center fastener 38 and is also adapted to form an aperture which surrounds second nozzle 34.

The outer diameter of second nozzle 34 is less than the internal diameter of the aperture formed by fastener support 36 so as to form an annular passageway that operates as second vacuum collector 40. Second vacuum collector 40 runs through fastener support 36 and into spray tube block 32. Consequently, second nozzle 34 is coaxially disposed within second vacuum collector 40.

Second spray assembly 18 further includes resin transfer conduit 41, second pressurized air supply 35, and jet 39. Resin transfer conduit 41 connects resin receiver 20 with the second nozzle 34. Second nozzle 34 is also connected to second air supply 35.

In operation, the uncoated fastener 38 is loaded onto fastener support 36. Fastener support 36 has a stepped shoulder 46, which includes a horizontal surface 48 and vertical surface 50. Horizontal surface 48 is dimensioned so as to support the bottom edge of fastener 38. Vertical edge 50 is dimensioned and positioned so as to center fastener 38 on fastener support 36. The fastener support 36 is, in turn, carried by conveyor 16 which is a circular carousel. Conveyor 16 is powered by a friction drive, but any known means can be employed to drive conveyor 16.

Alternate embodiments for transporting the fasteners may also include a reciprocating linear slide or a belt machine with two parallel belts, all well known to those of ordinary skill in the art.

In order for the heat fusible resin to adhere to the threads of fastener 38, it is necessary to first heat fastener 38 to a temperature above the melting point of the resin being applied. To that end, conveyor 16 transports fastener 38 along a path adjacent to heater 14. The prior art discloses a number of well-known heating equipment and processes which may be advantageously used with the preferred embodiment.

After heating, conveyor 16 transports both fastener 38 and resin receiver 20 along a path adjacent to and through first air-borne powdered resin stream 42. In the illustrated preferred embodiment, as fastener 38 first passes through first air-borne powdered resin stream 42, the external threads of fastener 38 are coated with resin. The internal threads of fastener 38 are thereafter coated with resin when resin receiver 20 passes through first air-borne powdered resin stream 42. The order in which fastener 38 or resin receiver 20 pass through first air-borne powdered resin stream 42 may be reversed in accordance with the invention.

Embodiments are also contemplated by the present invention in which the internal threads of fastener 38 are coated by the first air-borne powdered resin stream 42 and the external threads are coated when the resin receiver 20 passes through the first air-borne powdered resin stream 42.

In the operation of first powdered resin spray assembly 12, a first pressurized air supply 30 directs a stream of air through air supply conduit 24 and jet 29 which is then discharged through first nozzle 28. Resin is supplied by directing the air stream past reservoir conduit 26, thereby creating a vacuum which draws powdered resin out of resin reservoir 10. The transfer of resin from reservoir 10 into conduit 26 is facilitated by vibrating the reservoir housing by conventional vibration means well known to those of skill in the art. The powdered resin from reservoir 10 is then entrained in the air stream and discharged through first nozzle 28 creating first air-borne powdered resin stream 42.

Resin is conserved by drawing overspray into first vacuum collector 11, which opposes first nozzle 28. The collected resin can then be recycled.

In the operation of second spray assembly 18, second pressurized air supply 35 directs an air stream through jet 39 past resin transfer conduit 41 and through second nozzle 34. Resin transfer conduit 41 is shown in FIG. 3 as an L-shaped conduit that can slidably engage resin receiver 20.

The air stream generated by second air supply 35 and jet 39 is directed past resin transfer conduit 41. This creates a vacuum that aspirates powdered resin out of first air-borne powdered resin stream 42 and into resin receiver 20. The receiver, itself, includes a shroud 21 that projects above the receiver inlet 23 and acts as a resin collector. The resin then passes through resin transfer conduit 41 and into the second air stream where it is discharged through second nozzle 34 creating second powdered resin stream 44. The slide fit between transfer conduit 41 and receiver 20 provides an adjustment mechanism for positioning receiver 20. Thus, the amount of powder collected by resin receiver 20, which is in turn sprayed onto the internal threads of fastener 38, may be controlled by adjusting the height of resin receiver 20 on resin transfer conduit 41. The more resin receiver 20 is positioned within the first air-borne powdered resin stream 42 the more powdered resin will be aspirated and sprayed onto the internal threads of fastener 38. As a result, the amount of resin to be applied via second nozzle 34 to the internal threads may be controlled by adjusting the position of resin receiver 20. Alternatively, different size receivers may be used, with or without adjustment, to control the resin flow rate through the second nozzle.

Since second nozzle 34 is vertically positioned, it is desirable to configure the distal end of second nozzle 34 so as to horizontally discharge powdered resin in order to apply powdered resin to the internal threads of fastener 38. Moreover, the distal portion of second nozzle 34 should be positioned above fastener support 36 so as to have access to the internal threads of fastener 38.

Resin is again conserved by drawing overspray into second vacuum collector 40. The collected resin can then be recycled.

In order to prevent resin from adhering to second spray assembly 18, which also passes adjacent to heater 14, it is desirable to construct second spray assembly 18 of material which will heat at a slower rate than fastener 38. Second spray assembly 18, including resin receiver 20 and resin transfer conduit 41, should not reach temperatures sufficient to allow the heat fusible resin to adhere. This has been achieved by using induction heating techniques well known in the art and by making these components of brass, which heats at a slower rate than fastener 38, which is typically made of steel. In general, resin receiver 20 and resin transfer conduit 41 should be made from material having a lower heating rate in an induction field than that of fastener 38.

In accordance with the present invention, both the internal and external threaded surfaces of a fastener can be coated by using a two coordinated air-borne powdered resin stream and a single heater. Moreover, the amount of resin applied to the fastener by the second spray assembly can be adjusted by varying the position and/or size of the resin receiver within the first air-borne powdered resin stream. As a result, the size of the patch applied by the second spray assembly may be controlled independently from the patch directly applied by the first air-borne powdered resin stream. The ability to apply patches continuously to both the internal and external threaded surface of a fastener, along with the ability to individually adjust the amount of resin applied, is desirable due to the varying torque requirements of the internal and external threads of a fastener.

Figure 8:
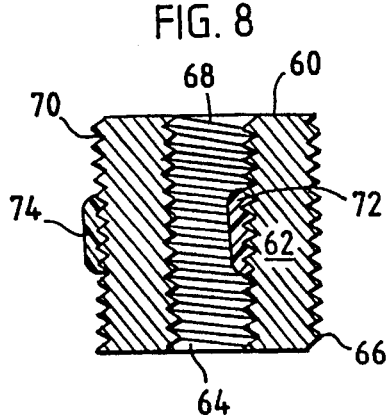
FIG. 8 is a cross-sectional view of one embodiment of the threaded fastener of the present invention.

FIG. 8 illustrates a threaded fastener 60 having a fastener body 62 with an internal cylindrical surface 64 and external cylindrical surface 66. A first set of threads 68 is disposed on internal cylindrical surface 64 and a second set of threads 70 is disposed on external cylindrical surface 66. In accordance with the present invention, an applied patch 72 of resilient thermoplastic material, such as nylon, is adhered to the first set of threads 68 and a second patch 74 of a like resilient thermoplastic material is adhered to the second set of threads 70. Patches 72 and 74 are adheringly applied to both the internal and external threads of fastener 60 by the apparatus and processes as described above.

It will be appreciated by those skilled in the art that various changes and modifications can be made to the illustrated embodiments without departing from the spirit of the present invention. All such modifications and changes are intended to be covered by the appended claims.

What is claimed is:

1. A method for applying a resin coating to both internal and external threads of a threaded fastener, comprising:

providing a powdered resin reservoir;

generating a first air-borne powdered resin stream from the powdered resin in said reservoir;

transporting said fastener along a path which first passes through a heating zone and thereafter through said first resin stream to apply said resin coating onto one of said internal or external threads; and generating a second district powdered resin stream directed at said fastener to apply said resin coating to the other of said internal or external threads, said second stream being generated by positioning a resin receiver to traverse said first resin stream and thereby provide a powdered resin supply for said seconded powdered resin stream.

2. The method of claim 1 wherein the internal and external threads are continuous and unmodified.

3. The method of claim 1 wherein said first resin stream applies said resin coating onto said external threads.

4. The method of claim 1 wherein said first resin stream applies said resin coating onto said internal threads.

5. The method of claim 1 wherein said first or second resin stream can apply said resin coating to any selected location on the internal threads of the fastener.

6. A method for applying a resin coating to any selected location on both internal and external threads of a threaded fastener, comprising the steps of:

providing a powdered resin reservoir;

generating a first air-borne powdered resin stream from the powdered resin in said reservoir;

directing said first resin stream along a path which intersects said fastener to apply said resin coating onto one of said internal or external threads;

generating a second distinct powdered resin stream by positioning a resin receiver within said first resin stream to traverse said first resin steam and thereby provide a powdered resin supply for said second powdered resin stream; and directing said second resin stream to apply said resin coating onto the other of said internal or external threads.

7. The method of claim 6 wherein the internal and external threads are continuous and unmodified.

8. The method of claim 6 wherein said first resin stream applies said resin coating onto said external threads.

9. The method of claim 6 wherein said first resin stream applies said resin coating onto said internal threads.

10. A method for applying a resin coating to any selected location on both internal and external threads of a threaded fastener, comprising the steps of:

providing a powdered resin reservoir;

generating a first air-borne powdered resin stream from the powdered resin in said reservoir;

directing said first resin stream along a path which intersects said fastener to apply said resin coating onto one of said internal or external threads;

generating a second distinct powdered resin stream using resin from said reservoir by positioning a resin receiver within said first resin stream to traverse said first resin steam and thereby provide a powdered resin supply for said second powdered resin stream; and directing said second resin stream to apply said resin coating onto the other of said internal or external threads.

\* \* \* \* \*